(12) United States Patent
Sohn et al.

(10) Patent No.: US 7,953,770 B2
(45) Date of Patent: May 31, 2011

(54) CONFLICT MANAGEMENT IN A VERSIONED FILE SYSTEM

(75) Inventors: Matthias E. Sohn, Speyer (DE); Christian K. Halstrick, Heidelberg (DE); Sasa Zivkov, Schwetzingen (DE); Edwin Kempin, Heidelberg (DE); Girish B. Hiranniah, Waldbronn (DE)

(73) Assignee: SAP AG, Walldorf (DE)

( * ) Notice: Subject to any disclaimer, the term of this patent is extended or adjusted under 35 U.S.C. 154(b) by 631 days.

(21) Appl. No.: 11/736,875

(22) Filed: Apr. 18, 2007

(65) Prior Publication Data

US 2008/0263107 A1    Oct. 23, 2008

(51) Int. Cl.
*G06F 7/00* (2006.01)
*G06F 17/30* (2006.01)

(52) U.S. Cl. ........................................ 707/809; 707/831
(58) Field of Classification Search ............... 707/10, 707/203, 809, 831
See application file for complete search history.

(56) References Cited

U.S. PATENT DOCUMENTS

| | | | |
|---|---|---|---|
| 6,473,794 B1 * | 10/2002 | Guheen et al. | 709/223 |
| 2002/0093583 A1 * | 7/2002 | Ito | 348/373 |
| 2002/0178225 A1 * | 11/2002 | Madenberg et al. | 709/206 |
| 2003/0088656 A1 * | 5/2003 | Wahl et al. | 709/223 |
| 2006/0010392 A1 * | 1/2006 | Noel et al. | 715/759 |
| 2006/0253547 A1 * | 11/2006 | Wood et al. | 709/217 |

* cited by examiner

*Primary Examiner* — Kuen S Lu
(74) *Attorney, Agent, or Firm* — Blakely Sokoloff Taylor & Zafman LLP

(57) ABSTRACT

Multiple files in a versioned file system are grouped to form a fusion unit on a server. The fusion unit is exposed to a client as a browsable folder having separate files. When the server receives an indication of a change to file belonging to the fusion unit, the server determines whether the change to the file causes a conflict on the fusion unit. If the change does cause a conflict, then the conflict is reported; otherwise the fusion unit is updated to incorporate the change.

20 Claims, 7 Drawing Sheets

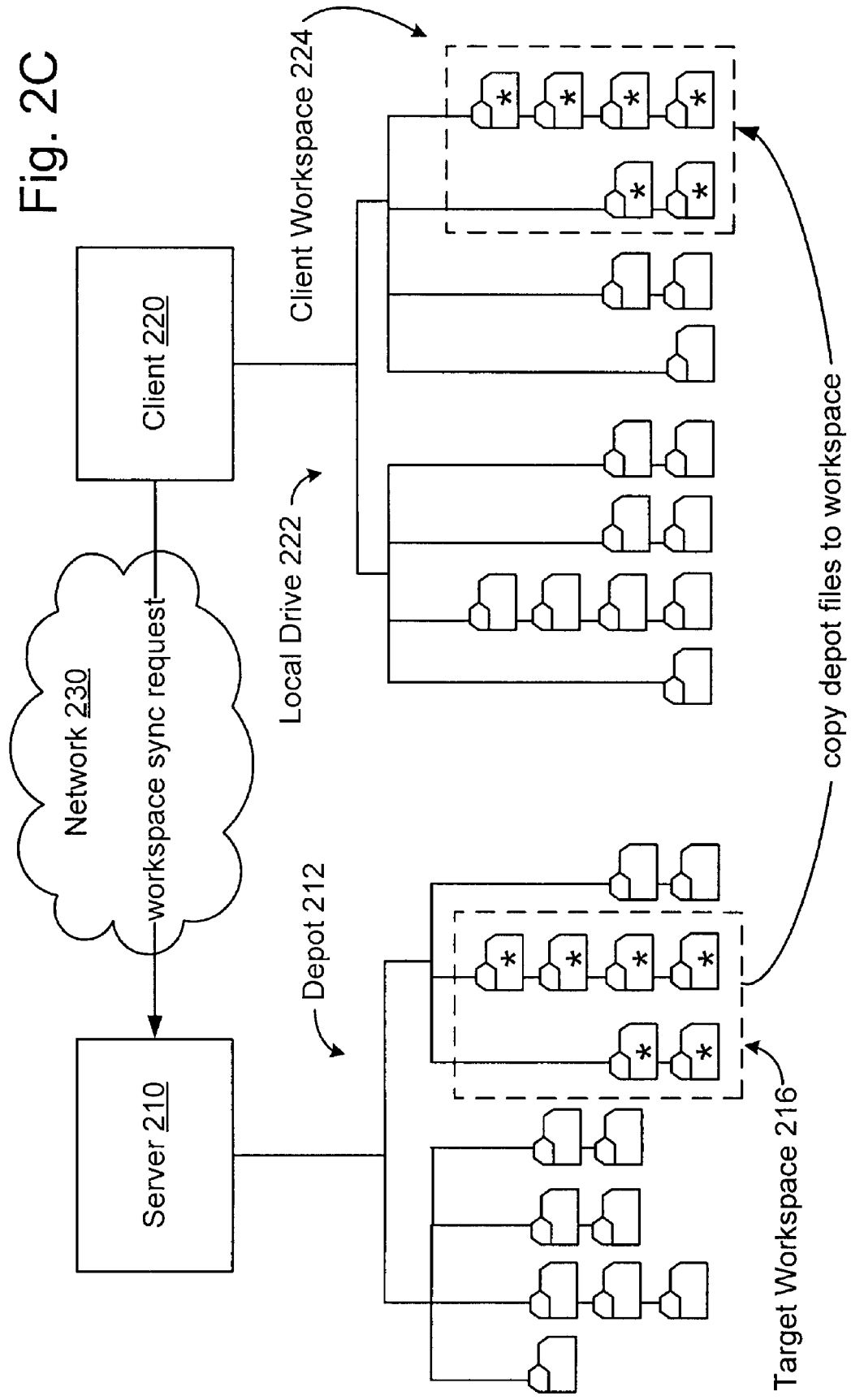

CONFLICT MANAGEMENT IN A VERSIONED FILE SYSTEM

FIELD

Embodiments of the invention relate to conflict management and more particularly to managing conflicts in a versioned file system.

BACKGROUND

File repositories, or depots, are commonly used to store file versions in a version control system. A versioning unit, as used herein, is an atomic unit with respect to change, collision detection and merge scope, and is always transported as a whole. Development tools map their development artifacts to depot files in such a way that one versioning unit maps to one depot file. This ensures that a collision or conflict on a versioning unit will be reflected as a collision or conflict on the corresponding file in the depot.

Modeling tools (e.g. Webdynpro) may be forced to map model elements which logically belong together (i.e., to one versioning unit) to multiple files due to restrictions enforced by the development environments on which the modeling takes place. This leads to a situation where concurrent changes to a versioning unit are not necessarily reflected as a file level collision.

For example, in FIG. 1, versioning unit 110 is mapped to two files A and B. Both files are at version 1, hence the file designations A1 and B1 shown in the figure. A first user edits versioning unit 110 and his changes are reflected by changes in file A only, thus creating version 2 of file A (i.e., A2). At the same time, a second user also edits versioning unit 110, but his changes are reflected by changes to file B only, thus creating version 2 of B (i.e., B2). The first user checks-in his changes. The second user subsequently checks in his changes and the check-in finishes without any collisions or conflicts.

Each user, from his own isolated point of view, made consistent changes to versioning unit 110. Indeed, states 120 and 130 in FIG. 1 bear out the perceived consistencies. However, the combined changes could bring file B into an inconsistent state inasmuch as state 140 was not created by either of the two users and is an untested mix of the two changes. If user B's changes result in an inconsistent state (e.g., state 140), it becomes incumbent on the version control system to catch the collision and force the second user to merge his changes on versioning unit 110 with the changes made by the first user. However, a traditional version control system is not able to detect the collision in this case because the collision scope is a single file.

In addition to the example problem described above, several other scenarios can also cause collisions and/or conflicts that can go undetected and/or unresolved by traditional conflict management systems.

SUMMARY

A method for managing files in a versioned file system is described herein. Multiple files are grouped together to form a fusion unit on a server. The fusion unit is exposed to a client as a browsable folder having separate files. When the server receives an indication of a change to a file belonging to the fusion unit, the server marks the fusion unit as having changed and determines whether the change causes a conflict on the entire fusion unit. If the server determines that the change causes a conflict, the server reports the conflict; otherwise, the fusion unit is refreshed to incorporate the change.

BRIEF DESCRIPTION OF THE DRAWINGS

The following description includes discussion of various figures having illustrations given by way of example of implementations of embodiments of the invention. The drawings should be understood by way of example, and not by way of limitation.

FIGS. 2A, 2B, and 2C are block diagrams illustrating embodiments having files stored in a depot.

DETAILED DESCRIPTION

Figure 1:
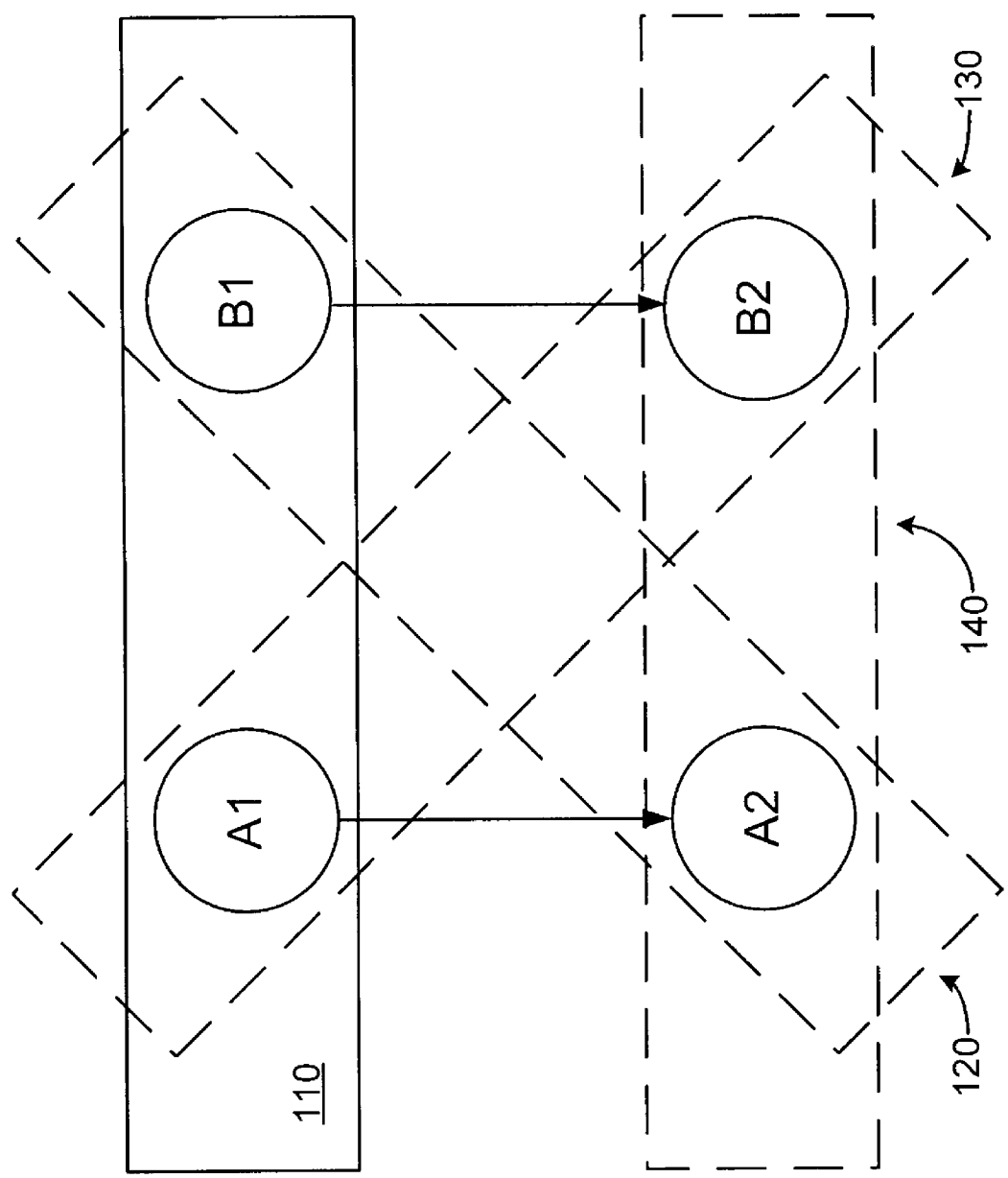
FIG. 1 is a block/flow diagram illustrating an example of a problematic conflict in a versioning system.

As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

A fusion unit, or simply fusion, is introduced as a new type of versioning unit in a versioned file system managed by a server and accessible by one or more clients. In one embodiment, fusions have an internal structure of non-versioned files and folders. From a client perspective, a fusion is similar to a folder (i.e., its internal structure is browsable in the same way as a folder is browsable). However, from the server perspective, a fusion is always checked-in as a single versioning unit. In other words, collisions/conflicts can only exist for the fusion as a whole and not for single members (e.g., files) within the fusion. The terms "collision" and "conflict" are used interchangeably herein and the use of one term is not intended to limit the scope of embodiments described herein.

In one example, a fusion F created under the /a/b/F path may have an internal structure that looks like this:
/c/d/e.txt
/c/a.txt Thus, the following Universal Resource Locators (URLs) are exposed by the server:
/a/b/F/c/
a/b/F/c/d
a/b/F/c/d/e.txt
a/b/F/c/a. txt In order to add a new member to a fusion, the user checks-out the fusion, adds the member (e.g., a file or a folder), and checks-in the fusion.

Similarly, to delete a fusion member, the user checks-out the fusion, deletes the member, and checks-in the fusion. Internally, there is a difference between deletion of a "normal" file ("normal" in the sense that the file is a versioned-unit by itself) and a file that is a member of a fusion. When a normal file is deleted a deleted version is created to record this change and to make it possible to transport the change. However, when a fusion member is deleted, no deleted version is created. Instead, the deletion event is captured by the creation of a new version of the fusion having the deleted member removed. Additionally, a deleted member can still be detected by comparing the current fusion version with its predecessor.

In one embodiment, to edit a member (e.g., file) of a fusion, the user checks-out the member (using the complete path to the member) just like checking out a normal (i.e., non-fusion) file. Internally, however, the server will always check-out the fusion in response to a check-out request for a single member of the fusion. In another embodiment, the user must check-out the fusion in order to edit a member of the fusion. Upon check-out, the server creates a working copy of the checked-out fusion member and notifies the client of the working copy. The user can then make modifications locally from the client and upload the changes to the working copy on the server, if necessary.

To revert changes on the checked-out member, the working copy is simply deleted as is done on a normal checked-out file. Again, although the fusion has its internal file/folder structure exposed to the client(s), it is still a single versioned resource.

In one embodiment, the server optimizes storage space for a fusion version. For example, if only one member of a fusion changes, the new version of the fusion will only consume the space needed for storage of the changed member. The content of any unchanged fusion members will be retrieved from a predecessor version of the same fusion.

Figure 2A:
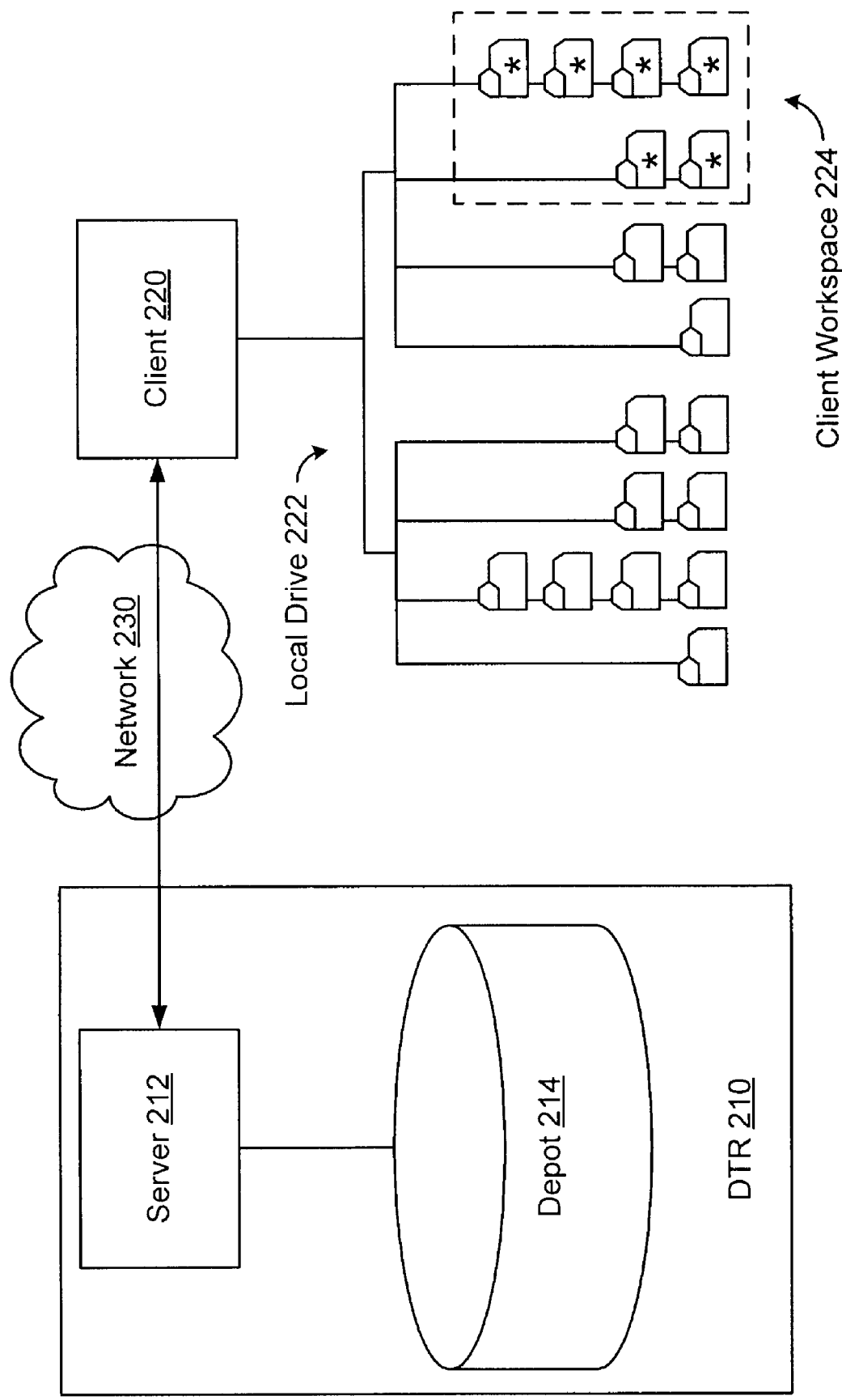

FIG. 2A is a block diagram illustrating an embodiment having files stored in a depot. Server 212 hosts the master file repository, or depot 214. For purposes of clarity and ease of description, server 212 and depot 214 are shown as single, separate entities. However, other embodiments can include multiple servers and/or multiple depots for each server. In one embodiment, server 212 and a file depot 214 together constitute a design time repository (DTR) 210, such as that employed by SAP AG of Walldorf, Germany.

Figure 2B:
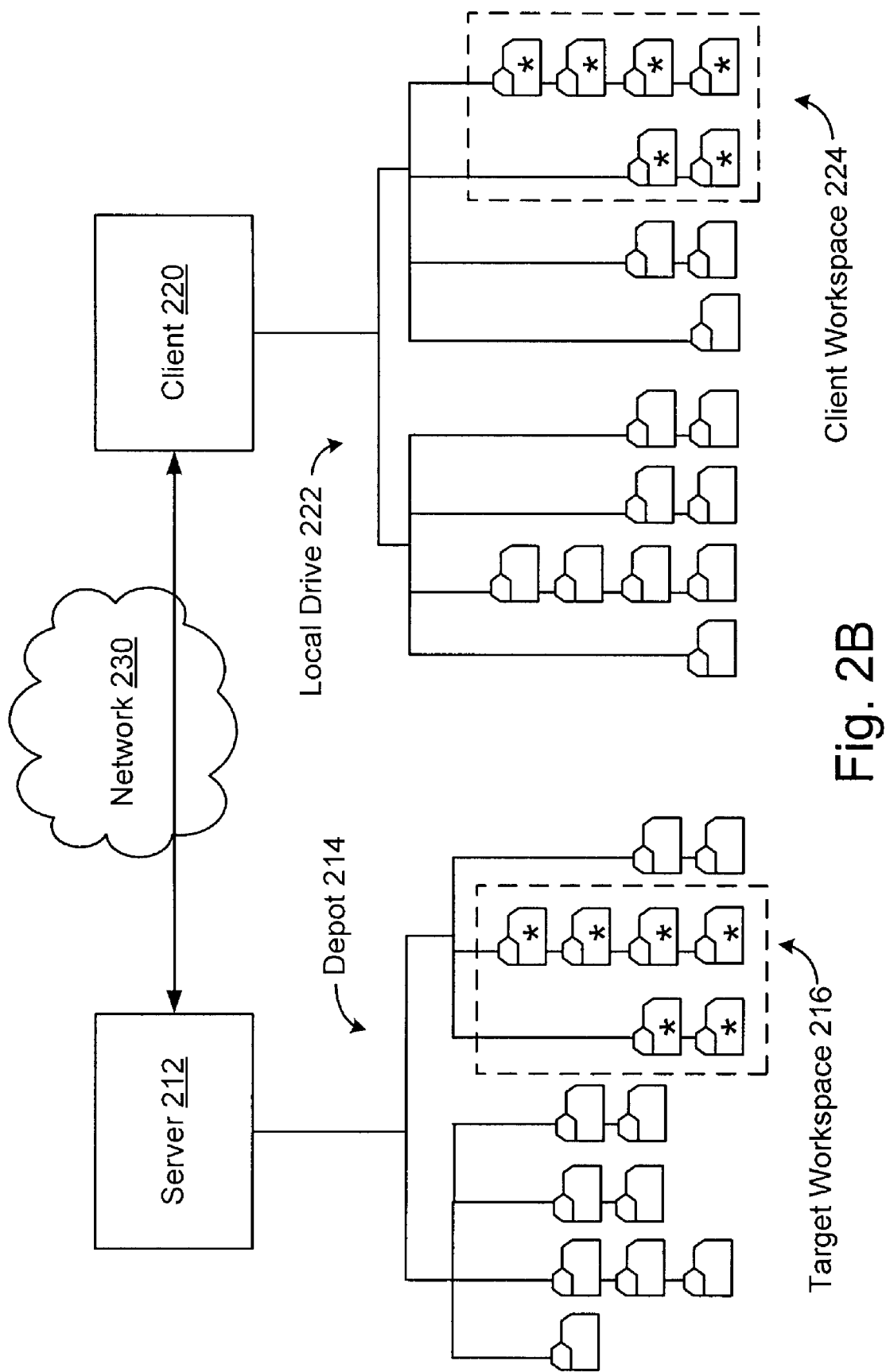

Depot 214 contains revisions of files under the control of server 212. Files in depot 214 are organized into directory trees, like a large hard drive. This organization is further illustrated in FIG. 2B. Files stored in depot 214 are referred to herein as depot files or versioned files. Server 212 maintains a database to track change logs, timestamps, user permissions, which users have which files checked-out at any given time, etc. The information stored in this database is referred to herein as metadata.

Rather than directly modifying files in depot 214, a client program manages a specially-designated area of local drive 222 called the client workspace 224, which contains a local copy of a portion of depot 214 referred to as the target workspace 216.

FIG. 2C illustrates a workspace sync request according to one embodiment. Client workspace 224 is populated with depot files by syncing the workspace. To sync client workspace 224, client 220 sends a workspace sync request to server 212. Based on metadata and other file information received in response to the request client 220 maps files from depot 214 into client workspace 224, compares the mapping results against the current contents of client workspace 224, and then adds, updates, or deletes files in client workspace 224 as needed to bring the workspace contents in sync with depot 214. Files synced to client workspace 224 are read-only and become writable when they are checked-out for editing.

Figure 3:
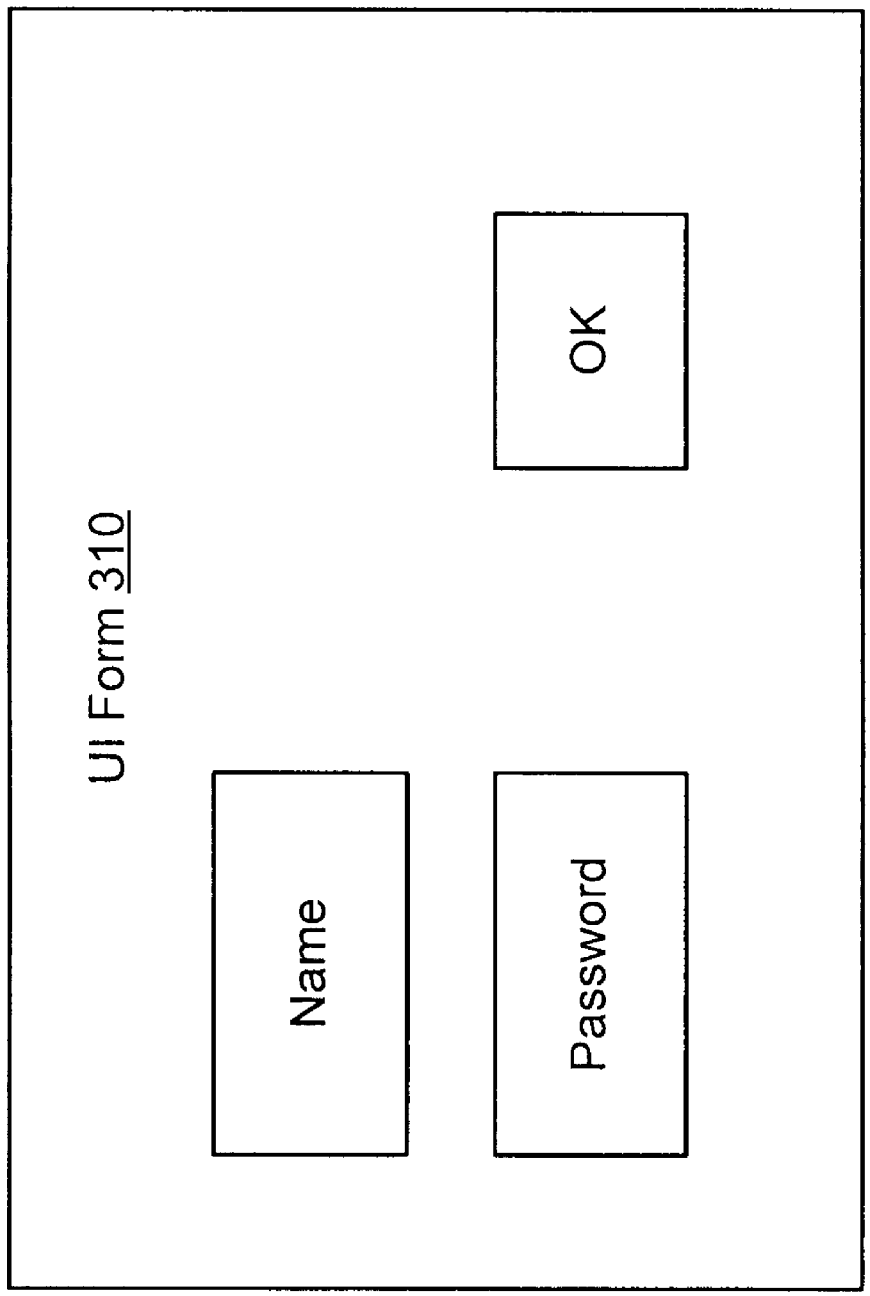
FIG. 3 illustrates an example of a user interface.

The following example illustrates a process for creating a fusion according to one embodiment. This example is intended to facilitate understanding of various embodiments described herein and does not limit the scope of the various embodiments. In this example, a user (e.g., developer, administrator, etc.) of client 220 develops/creates a user interface (UI) form to be employed as part of a login screen for project x. FIG. 3 illustrates a UI form 310, which includes a "name" field, a "password" field and an "ok" button. In order to create a fusion for UI form 310, the user first checks-out the project x folder from depot 214. Checking-out the project x folder creates a writable copy of the folder in client workspace 224.

Figure 4:
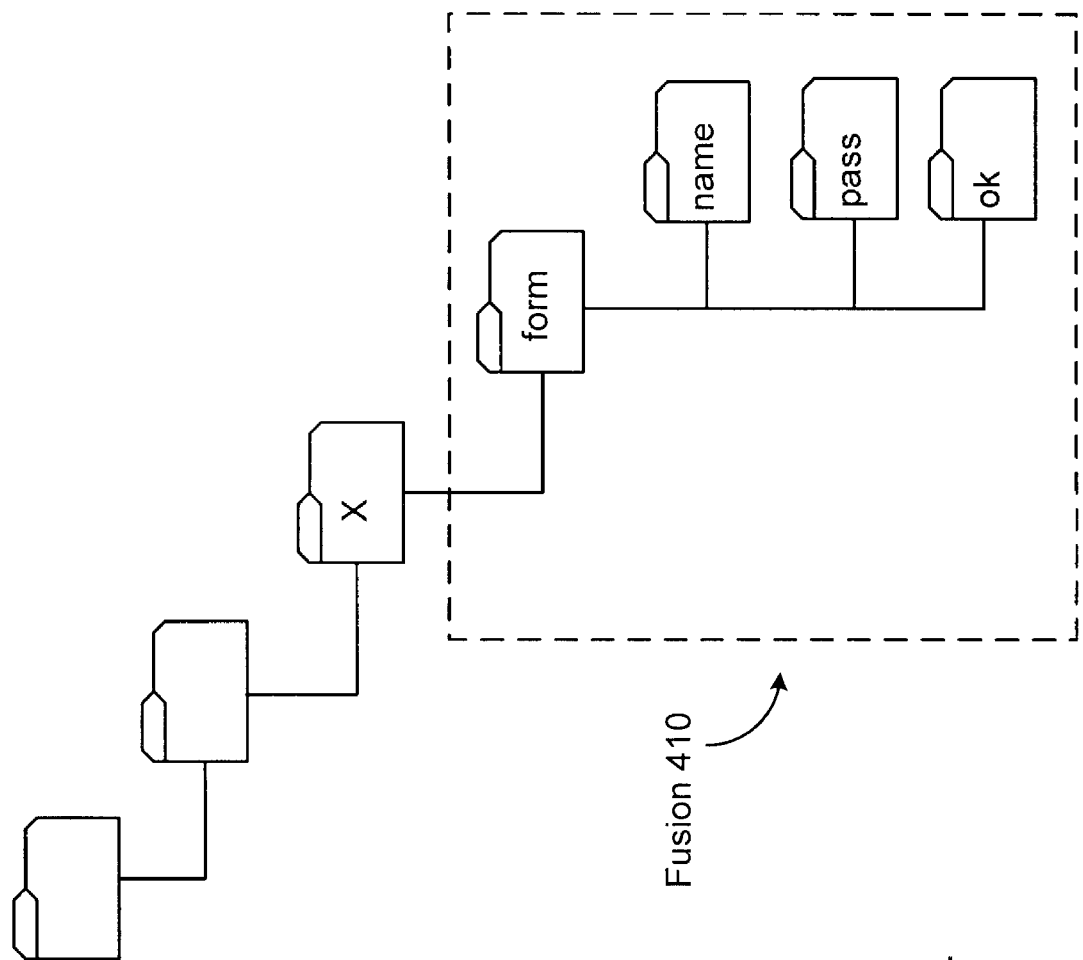
FIG. 4 is a block diagram illustrating an embodiment of a fusion.

Once the project x folder is checked-out, the user enters a command to generate a new fusion folder called "form" for UI form 310 within the project x folder in client workspace 224. As illustrated in FIG. 4, any file that is added to the "form" folder becomes part of fusion 410 upon an upload from client workspace 224 or upon check-in. Thus, the object files for the name field, the password field and the ok button are put into the "form" folder. Once the changes to project x are complete, the project x folder is checked-in to server 212, at which point target workspace 216 is updated and fusion 410 is exposed to clients connected to server 212 via a common URL schema. Fusion 410 is exposed as a browsable folder having separate files. From a client perspective, the "form" folder looks like a normal folder in depot 214 and the files in the "form" folder look like normal files. In one embodiment, fusions, such as fusion 410, are transparent to users accessing depot files from a client (e.g., client 220). In other embodiments, fusion files may be marked/tagged to distinguish them from normal files.

Continuing with the project x example, a second user working on project x may desire to make modifications to the name field of UI form 3 10. By browsing depot 214, the second user finds and selects the file associated with the name field of UI form 310 for check-out. Because the name field file belongs to fusion 410 (which may be transparent to the second user), the second user's request to check-out the name field file automatically causes the entire fusion 410 to be checked-out to the second user's client workspace.

When the second user completes his changes to the name field file, he checks-in his changes by submitting the client workspace copy to server 212. Even though the second user has modified the name field file, the fusion 410 is checked for collisions. If no collisions are detected, a new version of fusion 410 (not just the name field file) is stored in depot 214. In one embodiment, detected collisions are reported (e.g., to the user who checked-in the changes, an administrator or developer, etc.).

In one embodiment, a version history is provided for the fusion upon request. A request for the history of a member of the fusion returns a history of the fusion itself. An annotation mechanism allows those parts of the fusion history that are relevant to the member to be highlighted. Thus, for example, only fusion versions in which the member underwent a change might be highlighted using the annotation mechanism.

Figure 5:
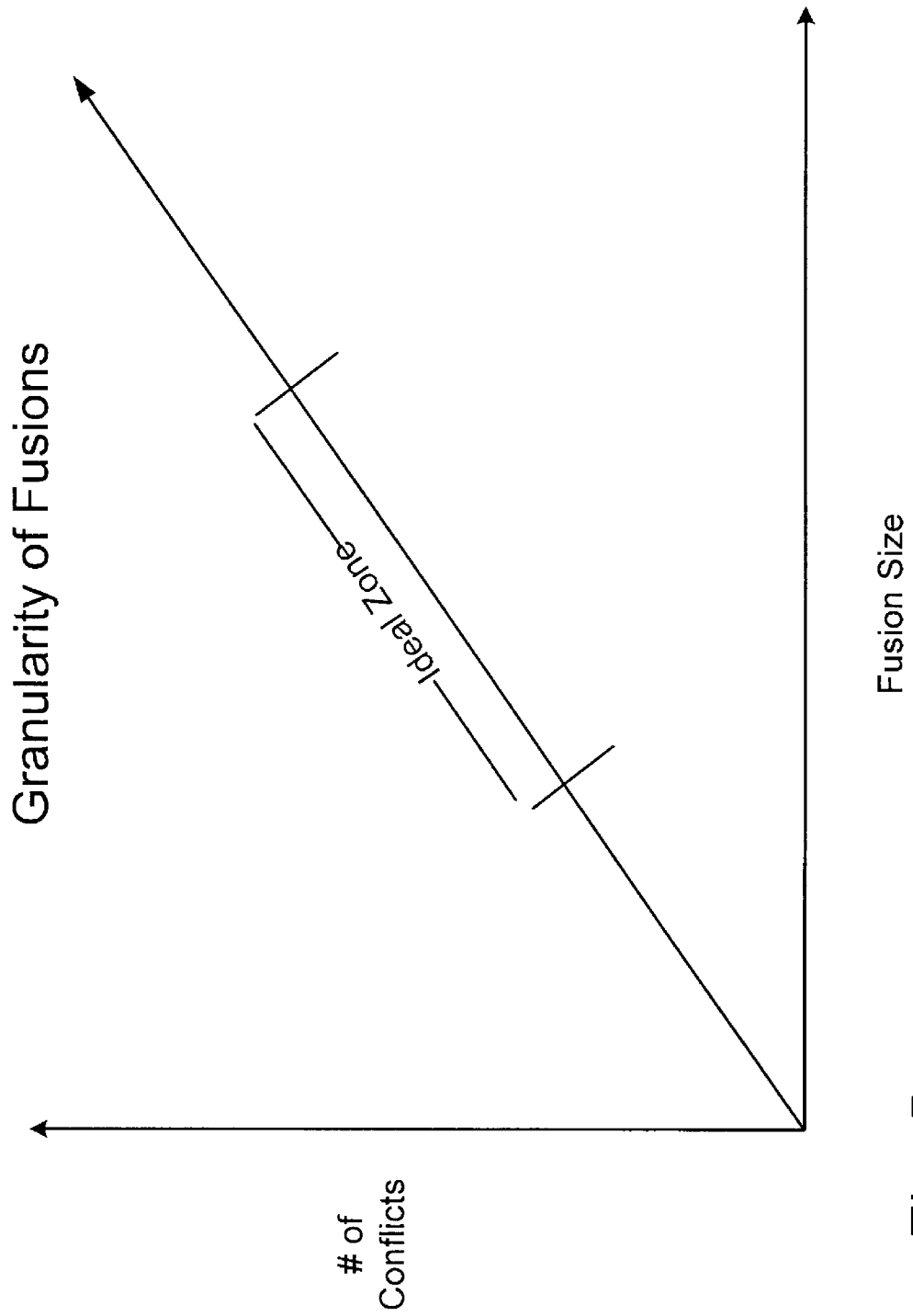
FIG. 5 is a graph illustrating the relationship between conflicts and fusion size according to one embodiment.

FIG. 5 is a graph illustrating the relationship between conflicts and fusion size according to one embodiment. Depending on the environment and other factors, if the fusion size is too small (encompassing few files), the number and frequency of conflicts detected on the fusion may also be too small to be meaningful or useful. However, if the fusion size is too large (encompassing a very large number of files), the number and frequency of conflicts detected on the fusion will be too large to manage and extremely complicated to resolve. Thus, an ideal zone exists for defining fusion size, though the ideal zone may vary from project to project. One important factor for finding an ideal zone for fusion size is determining those parts of a system that have, on an internal level, a tight coupling.

Embodiments described herein allow atomic integration of all files which form a part versioning unit. Thus, either all files of the versioning unit become active in the target workspace or none of them become active. If the files do not become active, a conflict necessarily exists on the entire versioning unit. If no conflict exists, the versioning unit has no conflicts.

Embodiments described herein allow for the calculation of a consistent set of versions corresponding to three states of the versioning unit involved in a conflict: 1) an "active version" state, 2) a "conflicting version" state, and 3) a "common ancestor" state. This is necessary for a merge tool to show an accurate representation of the versioning unit in the three different states.

Embodiments described herein are independent of integration policies and change propagation sequences. For example, embodiments described herein are compatible with SAP's design time repository (DTR) feature that supports sequence-independent propagation of changes between workspaces. Each component described herein may be a means for performing the functions described. Each component described herein includes software, hardware, or a combination of these. The components can be implemented as software modules, hardware modules, special-purpose hardware (e.g., application specific hardware), embedded controllers, etc. Software content (e.g., data, instructions, configuration) may be provided via an article of manufacture including a machine readable medium, which provides content that represents instructions that can be executed. The content may result in a machine performing various functions/operations described herein.

A machine readable medium includes any mechanism that provides (e.g., stores and/or transmits) information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.) A machine readable medium may also include a storage or database from which content can be downloaded. A machine readable medium may also include a device or product having content stored thereon at a time of sale or delivery. Thus, delivering a device with stored content, or offering content for download over a communication medium may understood as providing an article of manufacture with such content described herein.

As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:
   grouping a plurality of files as a single version unit to form a fusion unit on a server;
   exposing the fusion unit to a client as a browsable folder having separate files;
   receiving an indication of a change to a file belonging to the fusion unit;
   determining whether the indicated change to the file causes a conflict for the fusion unit; and
   reporting the conflict for the fusion unit if the indicated change to the file causes the conflict for the fusion unit, else updating the fusion unit on the server to incorporate the indicated change to the file, wherein the conflict can only exist for the fusion unit.

2. The method of claim 1, wherein if the change to the file causes a conflict, the method further comprising reconciling the conflict with the fusion unit based at least in part on a conflict resolution policy.

3. The method of claim 1, wherein the server is a design time repository (DTR) server.

4. The method of claim 1, wherein updating the fusion unit on the server to incorporate the change to the file comprises storing a new version of each fusion unit file, including the changed file.

5. The method of claim 1, further comprising:
   receiving a request from the client to check-out the file belonging to the fusion unit;
   generating a working copy of the fusion unit on the server in response to the request;
   receiving a changed copy of the file from the client;
   determining whether the changed copy of the file conflicts with the working copy of the fusion unit; and
   reporting any conflicts between the changed copy of the file and the working copy of the fusion unit.

6. The method of claim 5, further comprising checking-out the fusion unit to the client in response to the request to check-out the file.

7. The method of claim 5, further comprising providing a version history for a file belonging to the fusion unit in response to a version history request.

8. The method of claim 5, further comprising locking the file against check-out until the file is checked-in.

9. The method of claim 8, further comprising checking-out a different file belonging to the fusion unit to a different client before the locked file is checked-in.

10. The method of claim 1, further comprising:
    deleting a member of the fusion unit by checking-out the fusion unit, deleting the member of the fusion unit, and checking-in the fusion unit.

11. The method of claim 10, further comprising:
    assigning a new version to the fusion unit in response to checking-in the fusion unit.

12. An article of manufacture comprising a computer-readable medium having content stored thereon to provide instructions to result in an electronic device performing operations including:
    grouping a plurality of files as a single version unit to form a fusion unit on a server;
    exposing the fusion unit to a client as a browsable folder having separate files;
    receiving an indication of a change to a file belonging to the fusion unit;
    determining whether the indicated change to the file causes a conflict for the fusion unit; and
    reporting the conflict for the fusion unit if the indicated change to the file causes the conflict for the fusion unit, else updating the fusion unit on the server to incorporate the indicated change to the file, wherein the conflict can only exist for the fusion unit.

13. The article of manufacture of claim 12, wherein if the change to the file causes a conflict, the article of manufacture further having content to provide instructions to result in the electronic device performing additional operations including reconciling the conflict with the fusion unit based at least in part on a conflict resolution policy.

14. The article of manufacture of claim 12, wherein the server is a design time repository (DTR) server.

15. The article of manufacture of claim 12, wherein updating the fusion unit on the server to incorporate the change comprises storing a new version of each fusion unit file, including the changed file.

16. The article of manufacture of claim 12, further having content stored thereon to provide instructions to result in the electronic device to perform operations including:
  receiving a request from the client to check-out the file belonging to the fusion unit;
  generating a working copy of the fusion unit on the server in response to the request;
  receiving a changed copy of the file from the client;
  determining whether the changed copy of the file conflicts with the working copy of the fusion unit; and
  reporting any conflicts between the changed copy of the file and the working copy of the fusion unit.

17. The article of manufacture of claim 16, further comprising content to cause the electronic device to perform operations including checking-out the fusion unit to the client in response to the request to check-out a file.

18. The article of manufacture of claim 16, further comprising content to cause the electronic device to perform operations including providing a version history for a file belonging to the fusion unit in response to a version history request.

19. The article of manufacture of claim 16, further comprising content to cause the electronic device to perform operations including locking the file against check-out until the file is checked-in.

20. The article of manufacture of claim 19, further comprising checking-out a different file belonging to the fusion unit to a different client before the locked file is checked-in.

* * * * *